United States Patent Office 3,773,770
Patented Nov. 20, 1973

3,773,770
PROCESS FOR PREPARING PYRIDINE N-OXIDE CARBANION SALTS AND DERIVATIVES THEREOF
Ralph A. Damico, Colerain Township, Hamilton County, Ohio, assignor to The Procter & Gamble Company, Cincinnati, Ohio
No Drawing. Filed Sept. 30, 1968, Ser. No. 763,941
Int. Cl. C07d 31/02
U.S. Cl. 260—290 R          7 Claims

ABSTRACT OF THE DISCLOSURE

Process for preparing 2-pyridine N-oxide carbanion salts, 2-pyridinethiol N-oxides, salts thereof and 2,2'-dithiopyridine N,N'-dioxides which comprises the steps of (1) heating an alkali metal or alkaline earth metal salt of an α-picolinic acid at from 80° C. to about 150° C. to form a pyridine N-oxide carbanion salt and (2) reacting the carbanion salt formed thereby with a sulfur-containing compound.

BACKGROUND OF THE INVENTION

This invention relates in part to a method of preparing pyridine N-oxide derivatives. More particularly, it relates to a method of preparing pyridine N-oxide carbanion salts and methods for their conversion to 2-pyridinethiol N-oxide salts and 2,2'-dithiopyridine N,N'-dioxides.

Pyridinethiol N-oxides and salts thereof are known compounds having been described in U.S. Pats. 2,686,786 (Aug. 17, 1954), 2,809,971 (Oct. 15, 1957), 2,786,847 (Mar. 26, 1957), 3,236,733 (Feb. 22, 1966) and in J. Am. Chem. Soc. 72, 4362 (1950) and have been described as having antibacterial and antifungal properties. Such materials are especially noted for their remarkable anti-dandruff efficacy.

The 2-pyridinethiol N-oxides with which the present invention is concerned are believed to exist in tautomeric equilibrium with 1-hydroxy-2-pyridinethiones alternatively termed 1-hydroxy-2 (1H)-pyridinethiones. For example, 2-pyridinethiol N-oxide and its tautomeric form are represented as follows:

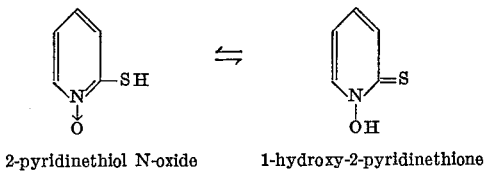

2-pyridinethiol N-oxide     1-hydroxy-2-pyridinethione

The term 2-pyridinethiol N-oxides as hereinafter employed is intended to encompass the tautomeric 1-hydroxy-2-pyridinethiones as well. Salts of these compounds may be represented by substitution of a cation for the hydrogen of one of the tautomeric forms. Depending upon the valence of the cation involved, there may be more than one pyridinethiol N-oxide group present in the compound. Disulfides of such compounds may be represented by the attachment of two 2-pyridinethiol N-oxide groups by the elimination of two hydrogens from the sulfur atoms to give a sulfur-to-sulfur or disulfide linkage.

The prior art preparation of salts of 2-pyridinethiol N-oxides has been effected by a process requiring a relatively large number of steps. Generally, the prior art practice of the preparation of 2-pyridinethiol N-oxide salts has included (1) conversion of a 2-halopyridine to a 2-halopyridine N-oxide by reaction with a per-acid such as perbenzoic or peracetic acid; (2) reaction of the N-oxide formed with an alkali metal hydrosulfide, alkali metal sulfide or thiourea to effect substitution of a mercapto group for the halo-substituent and (3) reaction of the 2-pyridinethiol N-oxide formed with an aqueous solution of a basic compound such as sodium carbonate or a heavy metal compound such as zinc nitrate to effect the formation of a 2-pyridinethiol N-oxide salt.

The prior art process as generally outlined is subject to certain disadvantages. One disadvantage of the prior art process is that it requires the isolation and purification of several intermediates. For example, the 2-halopyridine employed in the prior art process must be separated from the small amounts of 2,6 - dihalopyridine which inevitably form during the halogenation of pyridine despite the controlled conditions of halogenation employed. The purification of 2-halopyridine while tending to add to the cost of the initial starting material is necessary to avoid formation of undesirable disubstituted products which result from substitution of the halo-groups with mercapto groups upon subsequent reaction with alkali metal hydrosulfide.

Another undesirable aspect of the prior art process is the fact that the 2-halopyridine N-oxide produced by reaction of a per-acid with 2-halopyridine may not be reacted subsequently with an alkali metal sulfide or hydrosulfide to form the desired pyridinethiol N-oxide prior to separation from the unreacted per-acid. This separation is normally achieved by several extractions with hydrochloric acid solution followed by evaporation to dryness. Alternatively, the 2-halopyridine N-oxide may be prepared by reaction of the 2-halopyridine in acetic acid with a peracetic acid solution, and isolated by removal of acetic acid under reduced pressure, pouring of the residue over cracked ice, treatment with concentrated sodium hydroxide, extraction with chloroform, drying over magnesium sulfate, addition of ether, concentration and separation by filtration of the formed crystals. These techniques are described in U.S. Pat. 2,686,786.

A further disadvantage of the prior art method of preparing 2-pyridinethiol N-oxides is that certain of the per-acids, particularly peracetic acid, explode violently on heating which fact requires that processing conditions and precautionary measures be employed and carefully controlled so as to enable the process to be conducted safely and efficiently.

It is an object of the present invention to provide an improved method for preparing 2-pyridinethiol N-oxides and salts thereof.

It is another object of the present invention to provide an improved method for preparing 2,2'-dithiopyridine N,N'-dioxides.

It is a further object of the present invention to provide a method of preparing pyridine N-oxide carbanion salts which can be simply and efficiently converted to 2-pyridinethiol N-oxides, salts thereof and 2,2'-dithiopyridine N,N'-dioxides.

SUMMARY OF THE INVENTION

These and other objects of the present invention are achieved in accordance with the present invention which provides a process of preparing pyridine N-oxide carbanion salts and salts of pyridinethiol N-oxides comprising the steps of (1) decarboxylating an alkali or alkaline earth metal salt of an α-picolinic acid N-oxide at a temperature of about 80° C. to about 150° C.; and (2) reacting the pyridine N-oxide carbanion salt formed thereby at a temperature of about —70° C. to about 150° C. with a sulfur-containing transfer agent, the sulfur-containing transfer agent being susceptible of nucleophilic attack and transfer of a sulfur atom.

Also provided by the present invention is a novel process of preparing dithiopyridine N,N'-dioxides by a process which comprises the steps of (1) Decarboxylating an alkali or alkaline earth metal α-picolinate N-oxide salt by heating said α-picolinate N-oxide salt at a temperature of about 80° C. to about 150° C. as herein before described; and (2) Reacting the pyridine N-oxide carbanion salt formed thereby at a temperature of about −70° C. to about 150° C. with a sulfur monohalide of the formula $S_2X_2$ where X is halogen.

DETAILED DESCRIPTION OF THE INVENTION

The α-picolinic N-oxide salts employed in the present invention include the alkali and alkaline earth metal salts of α-picolinic N-oxide acids, the alkali metal picolinate salts being characterized by the presence of one pyridine N-oxide nucleus and the alkaline earth metal picolinate N-oxide salts by the presence of two such nuclei.

It has been found that subjecting these salts to temperatures of about 80° C. to about 150° C. effects decarboxylation with evolution of carbon dioxide and results, surprisingly, in the formation of pyridine N-oxide carbanion species

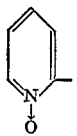

in the form of stable and recoverable alkali or alkaline earth metal salts

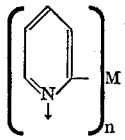

wherein M is an alkali metal cation, e.g. sodium, or an alkaline earth metal cation, e.g., calcium; and $n$ is one when M is an alkali metal and two when M is an alkaline earth metal.

The decarboxylation and formation of a stable carbanion salt is illustrated by the following scheme which represents the decarboxylation of lithium α-picolinate N-oxide to form the pyridine N-oxide carbanion salt, 2-lithiopyridine N-oxide:

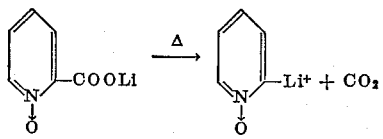

The α-picolinate N-oxide salts employed herein are known compounds which can be prepared readily by neutralization of the corresponding acids in accordance with any of the conventional neutralization procedures known to those skilled in the art. Preferably, the salts are prepared by neutralizing in the presence of a solvent hereinafter described with a reagent which does not during neutralization produce a co-product harmful to the carbanion salt produced during subsequent decarboxylation. Lithium hydride which evolves hydrogen gas with neutralization is an example of such a reagent. Other suitable reagents include lithium amide, butyllithium, and lithium metal. While aqueous alkaline reagents can be employed in the formation of α-picolinate N-oxides suitable herein, care must be exercised that the resulting compounds be rendered substantially anhydrous for the reasons hereinafter described.

The α-picolinate N-oxide salts of the present invention can be either substituted or unsubstituted compounds. As employed herein, the term "an α-picolinate N-oxide salt" refers to substituted and unsubstituted picolinate N-oxide salts. Substituted compounds are those having one or more hydrogen atoms on a pyridine N-oxide nucleus replaced by a substituent group. Suitable substituent groups which can be present at any one or more of the 3-, 4-, 5-, and 6-positions are those which are substantially non-interfering, i.e., those which will not either sterically or by induction hinder decarboxylation of the α-picolinate N-oxide salt, react with pyridine N-oxide carbanion as formed or undergo reaction with the organic solvent or diluent medium of the decarboxylation reaction. Suitable substituent groups include, for example, alkyl groups, straight or branched, containing 1 to about 12 carbon atoms (e.g., methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, undecyl, n-dodecyl); alkenyl of 2 to about 12 carbon atoms (e.g., vinyl, allyl, methallyl, octenyl, 11-dodecenyl; cycloalkyl (e.g., cyclopentyl, cyclohexyl); aryl of about 6 to about 12 carbon atoms (e.g., phenyl, 4-biphenylyl, 2-naphthyl); aralkyl of about 7 to about 18 carbon atoms (e.g., benzyl, naphthylmethyl, 2-phenylethyl); alkaryl of about 7 to about 18 carbon atoms (e.g., o-, m- or p-hexylphenyl, o-, m- or p-dodecylphenyl); alkoxy of 1 to about 12 carbon atoms (e.g., methoxy, ethoxy, n-octoxy, n-dodecoxy); aryloxy of 6 to about 12 carbon atoms (e.g., phenoxy, 4-biphenyloxy, 2-naphthoxy). The presence of certain non-reactive groups in or on the exemplary groups hereinbefore described is permissible.

Preferred picolinate N-oxide salts include the alkali metal (e.g., sodium, potassium, lithium) and alkaline earth metal (e.g., calcium, magnesium, barium) salts of α-picolinic acid N-oxide or 2-picolinic acid N-oxide,

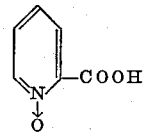

These unsubstituted salts are preferred since they can be readily prepared and undergo decarboxylation with facility to yield recoverable, stable pyridine N-oxide carbanion salts.

It will be appreciated that the above described α-picolinate N-oxides are described by way of example only and that any alkali metal or alkaline earth metal substituted N-oxide salt can be employed so long as the substituent groups are of a nature and are so positioned as to be substantially non-interfering as hereinbefore described.

The carbanion salts of the present invention are prepared by heating an α-picolinate N-oxide salt at a temperature of from about 80° C. to 150° C., preferably at about 100° C. to 120° C. The reaction or decomposition proceeds with evolution of carbon dioxide and is conducted for a period of time of about 1 to about 24 hours to result in the preparation of a stable pyridine N-oxide carbanion salt. Normally, the decomposition reaction is allowed to proceed until the evolution of carbon dioxide ceases.

The decarboxylation reaction of the present invention can be conducted in the absence of a solvent. For best yields, however, it is preferred that an organic diluent or solvent be employed. These diluents or solvents are organic materials which are substantially inert or non-reactive. They should not contain any reactive constituent either as a part of the structure of the solvent or diluent or as a part of impurities present therein.

Since alkali metal pyridine N-oxide carbanion salts are undesirably converted to pyridine N-oxides by reaction of a carbanion salt with a proton, suitable solvents herein are those which are aprotic and which under the decarboxylation conditions hereinbefore defined will not donate a proton for reaction with the carbanion salt. Similarly, suitable solvents or diluents herein are organic materials which are free of impurities which tend to react undesirably with carbanion salts. For example, water readily destroys pyridine N-oxide carbanion salts by donation of a proton to the carbanion salt. Accordingly, the solvents or diluents employed herein should be substantially anhydrous.

Suitable solvents or diluents are to be found in such classes of compounds as the aliphatic or aromatic hydrocarbons, aliphatic, aromatic or mixed-aliphatic-aromatic ethers, cyclic ethers and tertiary amines. Among the ether compounds which are suitable as solvents are dibutyl ether, anisole, diphenyl ether, dioxane, 1,2-dimethoxyethane and diethylene glycol dimethyl ether. Amine compounds which can serve as solvents for the decarboxylation reaction include tripropylamine, pyridine and morpholine. Examples of suitable non-reactive hydrocarbon solvents include "Stoddard" solvent, benzene, toluene and mixed xylenes. Still other compounds which are suitable are N,N-dialkyl amides such as dimethyl formamide and dimethyl acetamide; dialkyl sulfoxides such as dimethyl sulfoxide; nitriles such as acetonitrile, propionitrile, butyronitrile and valeronitrile; and hexaalkylphosphorotriamides such as hexamethylphosphorotriamide.

Preferred solvents or diluents herein are those having boiling points at atmospheric pressure of at least about 80° C. These materials are preferred because they make possible the rapid decarboxylation at atmospheric pressure of picolinate N-oxide salts at temperatures of 80° C. or higher. When solvents or diluents which boil at temperatures below about 80° C. are employed, the decarboxylation reaction which requires heating at a temperature of about 80° C. to about 150° C. can be conducted in sealed reactors, as for example, in an autoclave.

Especially preferred as solvents for decarboxylation are those organic, aprotic, materials which readily dissolve the sulfur-transfer agents hereinafter described. This facilitates conversion of the carbanion salt to the desired 2-pyridinethiol N-oxide salts because the carbanion salt need not be separated from the solvent upon completion of decarboxylation and can be reacted with the sulfur-transfer agent immediately upon completion of the decarboxylation reaction. These especially preferred solvents include, for example, dibutyl ether, diethylene glycol dimethyl ether, pyridine and dimethyl formamide.

The amount of solvent or diluent employed in the decarboxylation reaction is not a critical aspect of the present invention. A ratio of solvent or diluent to α-picolinate N-oxide salt on a weight basis of about 1:1 to about 50:1 is useful herein. A ratio of about 2:1 to about 10:1 is preferred for reasons of efficiency and economy of operation.

The pyridine N-oxide carbanion salts of the present invention are quite stable at temperatures as high as about 150° C. for periods of up to about 24 hours. These stable carbanion salts can be used to prepare useful compounds. For example, the salts of these carbanions will react with sulfur-containing transfer agents hereinafter described to provide 2-pyridinethiol N-oxide salts or with sulfur monohalides to provide 2,2'-dithiopyridine N,N'-dioxides.

They can also be reacted with sulfenyl halides of the formula RSX where X is halogen and R is halobenzyl (e.g., 2,3-dihalobenzyl) to provide useful herbicidal compounds of the formula

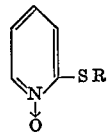

These compounds are described in U.S. Pat. 3,295,946 to D'Amico (Jan. 3, 1967).

While the pyridine N-oxide carbanion salts prepared according to the present invention can be isolated by evaporating the solution of carbanion in the reaction solvent to dryness in vacuo, it is normally inconvenient to do so since the carbanion salts can be employed in solution as intermediates in the preparation of useful derivatives. The reaction of a carbanion salt with a sulfur-containing transfer agent, sulfur monohalides or other reagent is preferably conducted in the same reaction vessel as the formation of the pyridine N-oxide carbanion salt by employing as a reactant the solution of organic solvent and pyridine N-oxide carbanion salt.

The carbanions prepared in the above described manner are converted to salts of 2-mercapto pyridine N-oxides by reaction with a sulfur-containing transfer agent. Reaction of 2-lithiopyridine N-oxide, for example, with a sulfur-transfer agent to provide the lithium salt of 2-pyridinethiol N-oxide takes place in accordance with the following scheme:

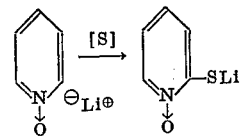

The reaction of the pyridine N-oxide carbanion salts of the present invention with a sulfur-containing transfer agent, more specifically defined hereinafter, can be effected by reacting the pyridine N-oxide carbanion salt with the sulfur-containing transfer agent at a temperature of from about −70° C. to about 150° C.

The amount of sulfur-transfer agent employed herein is an amount corresponding to a ratio of sulfur transfer agent to pyridine N-oxide carbanion salt of about 1:5 to 50:1 on a molar basis. It will be appreciated that the amount of sulfur transfer agent employed will vary with the particular transfer agent. For example, in the case of elemental sulfur, a ratio of about 1:2 to about 10:1, and preferably 1:1 to 5:1 is employed.

When temperatures toward the lower end of the specified temperature range are employed, the reaction normally is effected in about five hours whereas shorter periods of time, i.e., about one hour is required when the reaction is effected at higher temperatures. A preferred operating range is about 25° C. to 120° C., the reaction proceeding with facility and economy in this temperature range.

Normally, the reaction of a pyridine N-oxide carbanion salt and a sulfur-containing transfer agent is effected by the addition of the sulfur-containing compound to the solution which results from the preparation of the carbanion salt. The sulfur-containing transfer agent can, however, be present during decarboxylation. Any order of mixing can be employed, this not being a critical aspect of the present invention, so long as the requisite proportions of carbanion salt and sulfur-containing transfer agent are allowed to interact in the specified temperature range.

The sulfur-containing transfer agents which can be employed in effecting conversion of the pyridine N-oxide carbanion salts of the present invention to salts of 2-pyridinethiol N-oxide are those sulfur-containing compounds susceptible of nucleophilic attack and removal of a sulfur atom. Examples of sulfur-containing transfer agents which are utilizable in accordance with the present invention include the following materials:

(1) elemental sulfur (e.g., rhombic sulfur, monoclinic sulfur);
(2) alkali metal sulfides of the formula $M_2S_x$ where M is an alkali metal (e.g., sodium, potassium, lithium) and $x$ is an integer from 2 to about 50;
(3) sulfurammonium, $S_4N_4$;
(4) thiophosphoryl trihalides of the formula $P(S)X_3$ where X is halogen (e.g., chlorine bromine);
(5) alkyl- or aryldihalophosphine sulfides of the formula $R—P(S)X_2$; where R is alkyl of from 1 to about 12 carbon atoms (e.g., methyl, ethyl, ethylhexyl, dodecyl); aryl of from 6 to about 14 carbon atoms; and X is halogen;
(6) dialkylhalophosphine sulfides of the formula $$R_2P(S)X$$

where each R is alkyl of from 1 to about 12 carbon atoms and X is halogen;

(7) phosphinyl sulfenyl halides of the formula $$R(RO)P(O)SX$$

where each R is alkyl of 1 to about 12 carbon atoms and X is halogen;

(8) tetraalkylphosphonate disulfides of the formula $$[(RO)_2P(S)]_2$$

where each R is alkyl of 1 to about 12 carbon atoms;

(9) ethylene diphosphine disulfides of the formula $$[R_2P(S)CH_2-]_2$$

where each R is alkyl of 1 to about 12 carbon atoms;

(10) isothiocyanates of the formula RNC=S where R is and alkyl of from 1 to about 12 carbon atoms; aryl of 6 to about 14 carbon atoms (e.g., phenyl, naphthyl, biphenyl); and alkenyl of from 2 to about 12 carbon atoms (e.g., vinyl, allyl, 4-octenyl, 11-dodecenyl);

(11) diisothiocyanates of the formula SCN—R—NCS where R is an alkylene radical of from 1 to about 12 carbon atoms (e.g., methylene, ethylene, ethylidene, propylene);

(12) thioepoxides of the formula

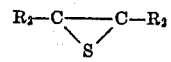

wherein each R is hydrogen or an alkyl or alkoxy of from 1 to about 12 carbon atoms; or aryl of from 6 to about 14 carbon atoms;

(13) ethylenethiocarbonates of the formula

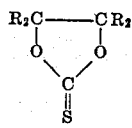

wherein each R is hydrogen; alkyl of from 1 to about 12 carbon atoms; or aryl of 6 to about 14 carbon atoms;

(14) thioketones of the formula $R_2C=S$ where each R is a tertiary alkyl of from 4 to about 12 carbon atoms or aryl of from 6 to about 12 carbon atoms; and

(15) organopolysulfides of the formula $R-(S)_x-R$ where each R is alkyl of from 1 to about 12 carbon atoms; or alkenyl of from 2 to about 12 carbon atoms; and x is an integer from 2 to 4.

Preferred sulfur-containing transfer agents are those which undergo reaction with the 2-pyridine N-oxide carbanion salts with facility and which are readily available. Preferred transfer agents are the various forms of elemental sulfur, the thioepoxides such as 2,3-epithiopropylmethylether, 2,3-epithiobutene and stilbenepisulfide, ethylene episulfide, and the alkali metal sulfides such as lithium disulfide, lithium trisulfide and sodium polysulfide.

Suitable sulfur-containing transfer agents and their formulas are as follows:

| | |
|---|---|
| Sodium disulfide | $Na_2S_2$ |
| Thiophosphoryl trichloride | $P(S)Cl_3$ |
| Butyldichlorothiophosphonate | $C_4H_9P(S)Cl_2$ |
| Diethylchlorothiophosphinate | $(C_2H_5)_2P(S)Cl$ |
| Methyl methoxyphosphinyl sulfenyl chloride | $(CH_3)(CH_3O)P(O)SCl$ |
| Tetraethylphosphonate disulfide | $[(C_2H_5O)_2P(S)]_2$ |
| 1,2-ethylenetetramethyldiphosphine disulfide | $[(CH_3)_2P(S)CH_2-]_2$ |
| Propylisothiocyanate | $C_3H_7NCS$ |
| Propyldiisothiocyanate | $SCN-C_3H_7-NCS$ |
| 1,2-diphenylethylenethioepoxide | 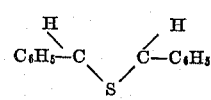 |
| Dimethyltrisulfide | $CH_3-S-S-S-CH_3$ |

It will be appreciated, of course, that the aforedescribed sulfur-containing transfer agents are listed by way of example only and are not intended as limiting the scope of the present invention. Since any sulfur-containing material having a sulfur atom capable of attack and removal by a negatively charged carbanion can be employed, the precise sulfur-containing transfer agent employed is not considered a critical aspect of the present invention.

In another embodiment of the present invention, the pyridine N-oxide carbanion salts formed by decarboxylation of an α-picolinate N-oxide salt are converted readily to 2,2'-dithiopyridine N,N'-dioxides.

The 2,2'-dithiopyridine N,N'-dioxides are prepared in accordance with this invention by reacting a pyridine N-oxide carbanion salt with a sulfur monohalide at a temperature of from about —70° to 150° C. The conditions of reaction are normally the same conditions under which the carbanions are allowed to react with the neutral or electrophilic sulfur-containing transfer agents hereinbefore described. The proportions of carbanion salt and sulfur-containing transfer agent which are employed depend on the particular carbanion salt employed. When an alkali metal 2-pyridine N-oxide carbanion salt is used, from about 0.25 to about 5 moles and preferably about 0.5 to about 2.5 moles of sulfur monohalide per mole of pyridine N-oxide carbanion salt are employed. When an alkaline earth metal 2-pyridine N-oxide carbanion salt is employed, about 0.5 to about 10 and preferably about 1 to about 5 moles of sulfur monohalide per mole of pyridine N-oxide carbanion salt are employed. Since the reaction does not appear to involve removal or transfer of a sulfur atom from a sulfur monohalide to the pyridine N-oxide carbanion salt, sulfur monohalides are not transfer agents in the sense hereinbefore employed. Rather, the two sulfur atoms present in sulfur monohalides remain substantially intact, the reaction proceeding by displacement of halogen atoms. The reaction of 2-lithiopyridine N-oxide, for example, with sulfur monochloride can be represented as follows:

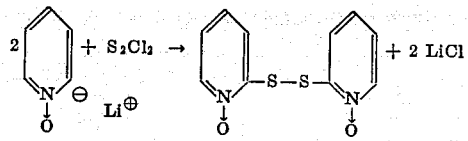

The alkali metal and alkaline earth metal salts of 2-pyridinethiol N-oxides prepared in accordance with the present invention are converted readily to 2-pyridinethiol N-oxides per se by neutralization of the alkali salts with an inorganic mineral acid. Hydrochloric acid, mentioned by way of example, is useful for this purpose. It will be appreciated, however, that any of the common mineral acids normally employed to effect neutralization can be likewise employed herein.

The heavy metal salts of 2-pyridinethiol N-oxides can be prepared by reacting a 2-pyridinethiol N-oxide or soluble salt thereof such as alkali metal or ammonium salt with a soluble compound of the desired heavy metal in a solvent for the reactants and recovering the reaction product. Suitable heavy metal salts useful in effecting formation of pyridine-thiol N-oxide salts include nitrates, halides, sulfates and acetates of copper, iron, manganese, tin, mercury, cobalt, chromium, lead, gold, cadmium, nickel, silver, zinc, zirconium, titanium, arsenic, antimony and bismuth. The term heavy metal as herein employed is intended to include heavy non-metals of metallic character, such as arsenic.

The alkali metal, alkaline earth metal, heavy metal and quaternary salts of 2-pyridinethiol N-oxides as well as α-pyridinethiol N-oxide per se are useful antibacterial and antifungal compounds and are described in U.S. Pats. 2,686,786 (Aug. 17, 1954); 2,742,393 (Apr. 17, 1956); 2,809,971 (Oct. 15, 1957); and 3,269,904 (Aug. 30, 1966). Esters useful as bactericides, fungicides and preservatives in leather, paper, and fabrics prepared by reaction of the sodium salt of 2-pyridinethiol N-oxide with fatty acid anhydrides are described in U.S. Pat. 3,310,568 (Mar. 21, 1967). Triphenyltin complexes of 2-pyridinethiol N-oxide are described in U.S. Pat. 3,321,480 (May 22, 1967). The 2,2'-dithiopyridine-N,N-dioxides prepared as hereinbefore described as well as stannous fluoride complexes thereof are also useful antifungal and antibacterial agents as described in U.S. Pats. 2,742,476 (Apr. 17, 1956) and 3,346,578 (Oct. 10, 1967).

The alkali metal salts of 2-pyridinethiol N-oxides and the 2,2'-dithiopyridine N,N-dioxides prepared in accordance with the present invention which possess antibacterial and/or anti-fungal properties can be employed in detergent formulations, particularly as antidandruff agents in shampoo compositions. Similarly, 2-pyridinethiol N-oxides per se as well as heavy metal salts thereof, particularly zinc, cadmium, tin and zirconium salts of pyridinethiol N-oxides and organic amine and quaternary salts are especially effective anti-dandruff compounds for use in shampoo formulations. The efficacy of these materials as anti-dandruff compounds is known and is described in detail in U.S. Pat. 3,236,733 (Feb. 22, 1966) the disclosure of which is hereby incorporated by reference.

The following examples illustrate in detail the preparation of compositions characterized by antibacterial, antifungal and/or antidandruff properties. It will be understood that the invention is not confined to the specific limitations set forth in the following examples but rather, to the scope of the appended claims.

EXAMPLE I

Preparation of the 2-lithiopyridine N-oxide carbanion salt and the lithium salt of 2-pyridinethiol N-oxide (A) A 250 ml. three-necked flask equipped with magnetic stirring means, a reflux column and a mineral oil bubbler connected to two (2) barium hydroxide traps in series was employed in the present example. To the flask was added 0.315 g. (0.0396 mole) of lithium hydride. Thereafter, 5.0 g. (0.036 mole) of picolinic acid N-oxide and 100 ml. of diglyme solvent $(CH_3OCH_2CH_2)_2O$ were added while sparging the flask with argon gas. The flask was heated to 100° C. for 4 hours. Decarboxylation and formation of the 2-lithiopyridine N-oxide carbanion salt in solution were evidenced by the evolution of carbon dioxide gas which was substantially complete. Analysis of the barium carbonate which formed in the barium hydroxide traps indicated that 85% of theoretical carbon dioxide gas evolution had been evolved. The solution of 2-lithiopyridine N-oxide in diglyme was used without further modification in part B which appears hereinafter.

Substantially equivalent results are obtained when either potassium α-picolinate N-oxide, sodium α-picolinate N-oxide, calcium α-picolinate N-oxide, magnesium α-picolinate N-oxide, or barium α-picolinate N-oxide is substituted for the 2-lithium picolinate N-oxide salt prepared in situ as described above in that the corresponding alkali and alkaline earth metal pyridine N-oxide carbanions are obtained.

(B) To the solution of pyridine N-oxide carbanion salt in diglyme prepared as described above was added 1.27 g. (0.0396 mole) of elemental sulfur. Heating at 100° C. was continued until approximately six hours had elapsed (including Step (A) above) with formation of the lithium salt of 2-pyridinethiol N-oxide. The reaction product was cooled to room temperature (approximately 25° C.), hydrolyzed with approximately 20 ml. of methanol, evaporated to dryness, dissolved in approximately 100 ml. of 50% potassium carbonate solution, extracted with approximately 200 ml. iso-propanol and evaporated to yield 3.5 g. of product. Thin layer chromatographic analysis indicated that the lithium salt of 2-pyridinethiol N-oxide comprised approximately 80% of the product.

EXAMPLE II

Preparation of the lithium salt of 2-pyridinethiol N-oxide

The apparatus of Example I was employed herein. A solution of 2-lithiopyridine N-oxide carbanion salt in diglyme was prepared as in Part (A) of Example I except that decarboxylation was conducted for two hours at 100° C. followed by 16 hours at 70° C. Analysis indicated 44% of theoretical carbon dioxide evolution. The solution was cooled to 80° C. and 3.96 g. of lithium trisulfide (0.036 mole) was added in the form of a solution in 100 ml. of tetrahydrofuran. The reaction mixture was stirred at 80° C. for three hours and was evaporated to dryness. The residue was dissolved in approximately 100 ml. of methanol and filtered. The filtrate was recovered and evaporated to yield a product which by thin layer chromatographic analysis was shown to contain the desired product, the lithium salt of 2-pyridinethiol N-oxide in a yield of 20%.

Similar results are obtained when the following sulfur transfer agents are employed in lieu of the lithium disulfide in that lithium salts of 2-pyridinethiol N-oxide are obtained: elemental sulfur; sulfurammonium; sodium polysulfide having a distribution of from 2 to about 40 sulfur atoms; thiophosphoryl tribromide; n-octyldichlorothiophosphonate; phenyldichlorothiophosphonate; dioctylchlorothiophosphinate; ethyl ethoxyphosphinyl sulfenyl chloride; tetrabutylphosphonate disulfide; 1,2-ethylenetetrabutyldiphosphine disulfide; phenylisothiocyanate; n-octylisothiocyanate, allylisothiocyanate; vinylisothiocyanate; butyldiisothiocyanate; ethylenethioepoxide; 1,2-di-n-hexylethylenethioepoxide; 1,2 - dimethoxyethylenethioepoxide; 1,2-diphenylethylenethiocarbonate; ethylenethiocarbonate; 1,2-dibutylethylenethiocarbonate; ditertbutylthioketone; diphenylthioketone; di-n-octyldisulfide; and diallyltetrasulfide.

EXAMPLE III

The apparatus of Example I was employed herein. To the reaction vessel were charged 5.0 g. (0.0345 mole) of lithium picolinate N-oxide, 2.2 g. (0.069 mole) of elemental sulfur and 150 ml. of diglyme. The reaction vessel was heated for four hours at 120° C. At the end of this time 96.3% of the theoretical amount of carbon dioxide evolution had evolved as evidenced by analysis of the barium carbonate formed in the barium hydroxide traps. The reaction product was filtered and washed with diethyl ether. The filtrate was evaporated to dryness, dissolved in approximately 50 ml. of methanol and filtered to remove impurities. Thin layer chromatographic analysis indicated that the product contained the desired compound, the lithium salt of 2-pyridinethiol N-oxide in approximately 35% yield based upon the amount of lithium picolinate N-oxide employed.

EXAMPLE IV

Preparation of the 2-sodiopyridine N-oxide carbanion salt and the sodium salt of 2-pyridinethiol N-oxide The same apparatus employed in Example I above is employed herein. To the flask are added 5.0 g. (0.031 mole) of anhydrous sodium 2-picolinate N-oxide (prepared by neutralization of α-picolinic acid N-oxide with aqueous sodium hydroxide followed by evaporation to dryness) and 100 ml. of xylene while sparging the flask with argon gas. The flask is heated to 120° C. until the evolution of carbon dioxide ceases. To the resulting solution of xylene and 2-sodiopyridine N-oxide carbanion salt is added 3.55 g. (0.034 mole) of 2,3-epithiopropylmethylether. The reaction vessel is heated at 80° C. for an additional two hours to yield the sodium salt of 2-pyridinethiol N-oxide in xylene. The product is recovered by evaporation to dryness.

When in the above example the following groups are substituted for one or more of the 3-, 4-, 5-, or 6-hydrogen atoms of 2-sodium picolinate N-oxide, substantially the same results are achieved in that the correspondingly substituted 2-sodiopyridine N-oxide carbanion salts are obtained: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene; n-decyl; undecyl; n-dodecyl; vinyl; propenyl; octenyl; 10-undecenyl; 11-dodecenyl; cyclopentyl; cyclohexyl; phenyl; biphenyl; naphthyl; benzyl; 2-phenyl-dodecyl; 1-methyl-2-phenylethyl; naphthylmethyl; p-hexylphenyl; m-dodecylphenyl; o-butylphenyl; methoxy; ethoxy; n-propoxy; isopropoxy; butoxy; n-dodecoxy; phenoxy; and biphenyloxy.

When in the above example the following solvents are substituted either wholly or in part for the xylene, substantially equivalent results are obtained in that the same reactions occur: benzene, 1,2-methoxy ethane (monoglyme), diphenyl ether, tetrahydrofuran, dioxane, N,N-dimethyl formamide, diethylene glycol dimethyl ether (diglyme), "Stoddard" solvent, toluene, pyridine, dibutyl ether, anisole, morpholine, dimethylacetamide, dimethylformamide, acetonitrile, propionitrile, butyronitrile, valeronitrile and hexamethylphosphorotriamide, and mixtures thereof.

EXAMPLE V

Preparation of the 2,2'-calcium pyridine N-oxide carbanion salt and the calcium salt of 2-pyridinethiol N-oxide Employing the apparatus of Example I, 5.0 g. of anhydrous calcium α-picolinate N-oxide (0.016 mole) is decarboxylated at 100° C. for four hours employing 100 ml. of dibutylether as the solvent, carbon dioxide gas being evolved. After cessation of $CO_2$ evolution, approximately 3.5 g. of the 2,2'-calcium pyridine N-oxide carbanion salt is formed. Subsequent reaction with 3 g. of lithium disulfide (0.038 mole) at 80° C. for approximately two hours forms a product which upon drying in vacuo yields approximately 3 g. of the calcium salt of 2-pyridinethiol N-oxide.

When the calcium α-picolinate N-oxide of the above example is replaced by either barium α-picolinate N-oxide or magnesium α-picolinate N-oxide, similar results are obtained in that stable alkaline earth metal pyridine N-oxide carbanion salts and alkaline earth metal salts of 2-pyridinethiol N-oxide are formed.

Similar results are obtained when the following sulfur transfer agents are employed in lieu of lithium disulfide in that calcium salts of 2-pyridinethiol N-oxide are obtained: elemental sulfur; sulfurammonium; sodium polysulfide having a distribution of from 2 to about 40 sulfur atoms; thiophosphoryl tribromide; n-octyldichlorothiophosphonate; phenyldichlorothiophosphonate; dioctylchlorothiophosphinate; ethylethoxyphosphinyl sulfenyl chloride; tetrabutylphosphonate disulfide; 1,2-ethylenetetrabutyldiphosphine disulfide; phenylisothiocyanate; n-octylisothiocyanate; allylisothiocyanate; vinylisothiocyanate; butyldiisothiocyanate; ethylenethioepoxide; 1,2-di-n-hexylethylenethioepoxide; 1,2 - dimethoxyethylenethioepoxide; 1,2-diphenylethylenethiocarbonate; ethylenethiocarbonate; 1,2-dibutylethylenethiocarbonate; ditertbutylthioketone; diphenylthioketone; di-n-octyldisulfide; and diallyltetrasulfide.

EXAMPLE VI

Preparation of the 2-potassiopyridine N-oxide carbanion salt and the potassium salt of 2-pyridinethio N-oxide Employing the apparatus of Example I, 5 g. of anhydrous potassium α-picolinate N-oxide (0.028 mole) is decarboxylated at 100° C. for four hours employing 100 ml. of pyridine as the solvent. Carbon dioxide gas is evolved with formation, after cessation thereof, of the stable carbanion, 2-potassiopyridine N-oxide in pyridine solvent. To the carbanion salt prepared as above is added 1.8 g. of sulfur (0.056 mole) at 100° C. Reaction for two hours at 100° C. yields the desired product, the potassium salt of 2-pyridinethiol N-oxide, which is recovered by evaporation to dryness.

Similar results are obtained when the following potassium 3-, 4-, 5- and/or 6-substituted α-picolinate N-oxide salts are employed in lieu of potassium α-picolinate N-oxide in that the correspondingly substituted 2-potassiopyridine N-oxide carbanion salts and potassium salts of 2-pyridinethiol N-oxide are obtained: $C_{1-12}$ alkyl (e.g., methyl, ethyl, n-propyl, isopropyl, n-butyl, isopentyl, n-hexyl, n-heptyl, 2-ethylhexyl, n-nonyl, n-dodecyl) substituted potassium α-picolinate N-oxides; $C_{2-12}$ alkenyl (e.g., vinyl, allyl, methallyl, 5-hexenyl, 4-decenyl, 11-dodecenyl) substituted potassium 2-picolinate N-oxides; $C_{6-12}$ aryl (e.g., phenyl, p-biphenylyl, naphthyl) substituted potassium 2-picolinate N-oxides; $C_{1-12}$ alkoxy (e.g., methoxy, ethoxy, n-butoxy, n-octoxy, n-dodecoxy) substituted potassium 2-picolinate N-oxides; and $C_{6-12}$ aryloxy (e.g., phenoxy, p-biphenyloxy) substituted potassium 2-picolinate N-oxides; cycloalkyl (e.g., cyclohexyl) substituted potassium 2-picolinate N-oxides; $C_{7-18}$ aralkyl (e.g., benzyl, 2-phenylethyl) substituted potassium 2-picolinate N-oxides and $C_{7-18}$ alkaryl (e.g., p-tolyl, o-dodecylphenyl) substituted potassium 2-picolinate N-oxides.

EXAMPLE VII

Preparation of the 2-sodiopyridine N-oxide carbanion salt and 2,2'-dithiopyridine-N,N'-dioxide Employing the apparatus of Example I, 10 g. (0.62 mole) of sodium α-picolinate N-oxide is added with argon flushing to the flask and 100 ml. of monoglyme (1,2-dimethoxyethane) is added. The picolinate N-oxide salt is decarboxylated at 80° C. for about four hours with evolution of carbon dioxide gas, which then ceases. The resulting stable carbanion salt, 2-sodiopyridine N-oxide is obtained in solution and is reacted without further modification as follows: To the solution of carbanion salt is added 8.5 g. (0.063 mole) of sulfur monochloride and heating is conducted for two hours at 80° C. The reaction product is filtered and the filtrate is evaporated to dryness to yield approximately 12 g. of 2,2'-dithiopyridine-N,N'-dioxide.

Similar results are obtained when either potassium α-picolinate N-oxide, lithium α-picolinate N-oxide, calcium α-picolinate N-oxide, magnesium α-picolinate N-oxide or barium α-picolinate N-oxide is substituted for the sodium α-picolinate N-oxide salt prepared in situ as described above in that the corresponding alkali and alkaline earth metal pyridine N-oxide cabanions are obtained.

Similar results are obtained when sulfur monobromide or sulfur monoiodide are employed in lieu of sulfur monochloride in that the desired 2,2'-dithiopyridine-N,N'-dioxide is formed.

When the following groups are substituted for one or more of the 3-, 4-, 5-, or 6-hydrogen atoms of 2-sodium picolinate N-oxide, substantially the same results are obtained in that the correspondingly substituted 2,2'-dithiopyridine-N,N'-dioxide compounds are prepared: methyl; ethyl; n-propyl; isopropyl; n-butyl; isobutyl; n-pentyl; isopentyl; n-hexyl; n-heptyl; n-octyl isooctyl; 2-ethylhexyl; diisobutyl; n-nonyl; tripropylene; n-decyl; undecyl; n-dodecyl; vinyl; propenyl; octenyl; 10-undecenyl; 11-dodecenyl; cyclopentyl; cyclohexyl; phenyl; biphenyl; naphthyl; benzyl; 2-phenyl-dodecyl; 1-methyl-2-phenylethyl; naphthylmethyl; p-hexylphenyl; m-dodecylphenyl; o-butylphenyl; methoxy; ethoxy, n-propoxy; isopropoxy; butoxy; n-dodecoxy; phenoxy; and biphenyloxy.

EXAMPLE VIII

Preparation of 2-pyridinethiol N-oxide

The dried lithium salt of 2-pyridinethiol N-oxide, obtained from Exmaple I (A) and (B) above, is dissolved in approximately 25 ml. of water and acidified with approximately 10 ml. of 6 N hydrochloric acid. Evaporation of the solution results in the recovery of approximately 2.5 g. of 2-pyridinethiol N-oxide crystals.

EXAMPLE IX

Preparation of the zinc salt of 2-pyridinethiol N-oxide

The lithium salt of 2-pyridinethiol N-oxide prepared in Example I(A) and (B) is dissolved in approximately 15 ml. of water and is added to a solution of 2.7 g. (0.02 mole) of zinc chloride and allowed to react for approximately 10 minutes at approximately 25° C. The product upon separation by filtration is the zinc salt of 2-pyridinethiol-N-oxide.

The foregoing description of the invention has been presented describing certain operable and preferred embodiments. It is not intended that the invention should be limited since variation and modifications thereof will be obvious to those skilled in the art, all of which are within the spirit and scope of this invention.

What is claimed is:

1. The process of preparing an alkali or alkaline earth metal pyridine N-oxide carbanion salt which comprises decarboxylating an α-picolinate N-oxide salt by heating said α-picolinate N-oxide salt at a temperature of from about 80° C. to about 150° C. in the presence of an aprotic organic solvent; said α-picolinate N-oxide salt being selected from the group consisting of alkali metal α-picolinate N-oxide salts, alkaline earth metal α-picolinate N-oxide salts, alkali metal substituted α-picolinate N-oxide salts and alkaline earth metal substituted α-picolinate N-oxide salts; said substituted α-picolinate N-oxide salts having one or more hydrogen atoms on a pyridine N-oxide nucleus replaced by a substituent selected from the group consisting of alkyl of from 1 to about 12 carbon atoms, alkenyl of from 2 to about 12 carbon atoms, cycloalkyl, aryl of from about 6 to about 12 carbon atoms, aralkyl of from about 7 to about 18 carbon atoms, alkaryl of about 7 to about 18 carbon atoms, alkoxy of from 1 to about 12 carbon atoms, and aryloxy of from 6 to about 12 carbon atoms; said substituted α-picolinate N-oxide salts having substituents so positioned as to be substantially noninterfering.

2. The process of claim 1 wherein the α-picolinate N-oxide salt is heated at a temperature of from about 100° C. to about 120° C.

3. The process of claim 2 wherein the organic solvent has a boiling point at atmospheric pressure of at least about 80° C. and is employed in a ratio of solvent to α-picolinate N-oxide salt of about 50:1 to about 1:1 by weight.

4. The process of claim 3 wherein the α-picolinate N-oxide salt is an alkali metal α-picolinate N-oxide.

5. The process of claim 4 wherein the alkali metal α-picolinate N-oxide salt is lithium α-picolinate N-oxide.

6. The process of claim 4 wherein the alkali metal α-picolinate N-oxide salt is sodium α-picolinate N-oxide.

7. The process of claim 1 wherein the aprotic organic solvent is substantially anhydrous.

References Cited

Haake et al.: J. Am. Chem. Soc., vol. 86, pp. 5230–34 (1962).

Klingsberg: Heterocyclic Compounds: Pyridine and Derivatives, Part 3, p. 206 (Interscience Publ., N.Y.) (1962).

Quast et al.: Angew. Chem. Internat'l Edit., vol. 4, p. 691 (1965).

Parker: Advances in Organic Chemistry: Methods and Results, vol. 5, pp. 1–39 (1965).

HARRY I. MOATZ, Examiner

U.S. Cl. X.R.

260—290 V, 290 HL, 294.8 G, 294.8 T, 294.8 C, 295 R, 297 R, 242; 424—245, 263